US010123382B2

(12) United States Patent
 Yang et al.

(10) Patent No.: US 10,123,382 B2
(45) Date of Patent: Nov. 6, 2018

(54) CONSTANT VOLTAGE AND CURRENT SYNCHRONIC OUTPUT POWER SUPPLY AND TELEVISION

(71) Applicant: Shenzhen Skyworth-RGB Electronic Co., Ltd., Shenzhen (CN)

(72) Inventors: Jitao Yang, Shenzhen (CN); Jianzhong Chen, Shenzhen (CN)

(*) Notice: Subject to any disclaimer, the term of this patent is extended or adjusted under 35 U.S.C. 154(b) by 22 days.

(21) Appl. No.: 15/494,881

(22) Filed: Apr. 24, 2017

(65) Prior Publication Data

US 2017/0231041 A1 Aug. 10, 2017

Related U.S. Application Data

(63) Continuation of application No. PCT/CN2016/086541, filed on Jun. 21, 2016.

(30) Foreign Application Priority Data

Nov. 2, 2015 (CN) .......................... 2015 1 0736057

(51) Int. Cl.
 *H05B 33/08* (2006.01)
 *H02M 3/335* (2006.01)
 *H02M 1/08* (2006.01)
 *H04N 5/63* (2006.01)

(52) U.S. Cl.
 CPC .......... *H05B 33/0815* (2013.01); *H02M 1/08* (2013.01); *H02M 3/33523* (2013.01); *H04N 5/63* (2013.01); *H05B 33/0851* (2013.01)

(58) Field of Classification Search
 CPC . H05B 33/0815; H05B 33/0851; H02M 1/08; H02M 3/33523; H04N 5/63
 See application file for complete search history.

(56) References Cited

U.S. PATENT DOCUMENTS

| 2007/0047268 | A1* | 3/2007 | Djenguerian | ..... H02M 3/33515 363/21.13 |
| 2008/0247202 | A1* | 10/2008 | Djenguerian | ..... H02M 3/33523 363/78 |
| 2012/0287682 | A1* | 11/2012 | Zhang | ............... H02M 3/33507 363/21.16 |

FOREIGN PATENT DOCUMENTS

| CN | 202475621 U | 3/2012 |
| CN | 202268152 U | 6/2012 |
| CN | 202404873 U | 8/2012 |

(Continued)

*Primary Examiner* — Douglas W Owens
*Assistant Examiner* — Pedro C Fernandez
(74) *Attorney, Agent, or Firm* — Wayne & King LLC

(57) ABSTRACT

A constant voltage and current synchronic output power supply and a television are disclosed. The constant voltage and current synchronic output power supply comprises a transformer for supplying power to LED loads, a conversion circuit for converting an inputted AC power supply to a DC square wave power supply that is provided to the transformer, a PWM control circuit for driving the transformer, a constant voltage control circuit and a constant current control circuit, the transformer comprises a constant voltage output winding and a constant current output winding, wherein the constant voltage control circuit is configured for sampling voltages outputted by the constant voltage output winding then transferring the sampled voltages into the corresponding signals that are feedbacked to the PWM control circuit, to perform constant voltage control on the output voltage of the transformer.

18 Claims, 2 Drawing Sheets

(56) References Cited

FOREIGN PATENT DOCUMENTS

| CN | 105322803 A | 2/2016 |
| JP | H07307691 A | 11/1995 |

\* cited by examiner

CONSTANT VOLTAGE AND CURRENT SYNCHRONIC OUTPUT POWER SUPPLY AND TELEVISION

CROSS-REFERENCE TO RELATED APPLICATIONS

This application is a continuation of International Patent Application No. PCT/CN2016/086541 with a filing date of Jun. 21, 2016, designating the United States, now pending, and further claims priority to Chinese Patent Application No. 201510736057.2 with a filing date of Nov. 2, 2015, designating the United States, now pending. The content of the aforementioned applications, including any intervening amendments thereto, are incorporated herein by reference.

TECHNICAL FIELD

The present invention relates to power supply technology field, and more particularly, to a constant voltage and current synchronic output power supply and a television.

BACKGROUND OF THE PRESENT INVENTION

In the prior art, the television power architecture is the power supply modes of the constant voltage output circuit and constant current output circuit are integrated into one power supply architecture, by the constant voltage output circuit and constant current output circuit to control the same one transformer outputting corresponding constant voltage and constant current. Even though the television power architecture is relatively simple, which only outputs constant voltage or constant current at one time, cannot output both at the same time. However, some components in the television need synchronism input of constant voltage and constant current. The television power architecture in the prior art cannot satisfy the above requirements, thus need adding another auxiliary power supply to provide constant current or constant voltage.

SUMMARY OF PRESENT INVENTION

The present invention aims to provide a constant voltage and current synchronic output power supply, enabling the television power supply to realize synchronism output of constant voltage and constant current.

In order to realize the above aims, the present invention provides a constant voltage and current synchronic output power supply. The constant voltage and current synchronic output power supply includes a transformer for supplying power to LED loads; a conversion circuit for converting an inputted AC power supply to a DC squarewave power supply that is provided to the transformer; and a PWM control circuit for driving the transformer; the constant voltage and current synchronic output power supply further includes a constant voltage control circuit and a constant current control circuit; the transformer includes a constant voltage output winding and a constant current output winding; the input end of the constant voltage control circuit is connected with the constant voltage output winding; the output end of the constant current output circuit is connected with a feedback end of the PWM control circuit; the LED loads are connected with the constant current output winding; the power supply end of the constant current control circuit is connected with the constant voltage output winding; a current control end of the constant current control circuit is connected with LED loads.

The constant voltage control circuit is configured for sampling the output voltage of the constant voltage output winding, then transferring the sampled voltages into the corresponding signals that are feedbacked to the PWM control circuit, to perform constant voltage control on the output voltage of the transformer.

The constant current control circuit is configured for receiving the output voltage of the constant voltage output winding then opening, to perform constant current control on the current flowing through LED loads.

Preferably, the constant voltage control circuit includes a sampling circuit and a voltage-stabilizing feedback circuit. The sampling circuit comprises a first resistance and a second resistance. A first end of the first resistance is connected with the output end of the constant voltage output winding. A second end of the first resistance is grounded by passing through the second resistance. The voltage-stabilizing feedback circuit includes a first optocoupler, a first voltage reference chip and a third resistance. A control input end of the first optocoupler is connected with the output end of the constant voltage output winding by passing through the first resistance. A control output end of the first optocoupler is connected with a negative end of the first voltage reference chip. An executing input end of the first optocoupler is connected with the feedback end of the PWM control circuit. The executing output end of the first optocoupler is grounded. The positive end of the voltage reference chip is grounded. A voltage reference end of the voltage reference chip is connected with the second end of the first resistance.

Preferably, the constant current control circuit includes a voltage reference circuit and at least a constant current control branch. An input end of the voltage reference circuit is connected with an output end of the constant voltage output winding. The voltage reference circuit is connected with a power supply end of the constant current control branch. An enable end of the voltage reference circuit receives external light signals. The voltage reference circuit is configured for providing reference voltage to the constant current control branches during receiving the external light signals. The constant current control branch is configured for providing constant current loop to the LED loads.

Preferably, the voltage reference circuit includes a fourth resistance, a fifth resistance, a sixth resistance, a seventh resistance, a first switching tube, a second switching tube and a second voltage reference circuit chip. A first end of the fourth resistance is connected with an output end of the constant voltage output winding. A second end of the fourth resistance is connected with the input end of the first switching tube. An output end of the first switching tube is connected with a negative end of the second voltage reference chip. A controlled end of the first switching tube is connected with the input end of the second switching tube by passing though the sixth resistance. The output end of the second switching tube is grounded. The controlled end of the second switching tube is connected with the first end of the seventh resistance. A second end of the seventh resistance is configured for receiving external light signals. A positive end of the second voltage reference chip is grounded. The voltage reference end of the voltage reference chip is connected with the power supply end of the constant current control branch.

Preferably, the constant current control branches are multiple, each constant current control branch is in parallel connection.

Preferably, each constant current control branch includes a switching tube and a current-limiting resistance. The controlled end of the switching tube is connected with the voltage reference end of the voltage reference chip. The input ends of the switching tube are connected with each other, to connect the output end of the LED loads. The output end of the switching tube is grounded by passing though the current-limiting resistance.

Preferably, the constant voltage and current synchronic output power supply further comprises a correction circuit. The correction circuit is connected between the LED loads and the constant voltage control circuit, and configured for when voltage deviation of the LED loads is large, the constant voltage control circuit outputs correction signals to the constant voltage control loop, to adjust the voltage outputted by the constant current output winding.

Preferably, the correction circuit includes a eighth resistance, a ninth resistance, a first diode and a first capacitance. A first end of the eighth resistance is connected with the LED loads. A second end of the eighth resistance is connected with the positive end of the first diode by passing through the ninth resistance. A first end of the first capacitance is connected with the second end of the eighth resistance. The second end of the eighth resistance is grounded.

Preferably, the PWM control circuit includes a third switching tube and a power management chip. The driving end of the power management chip is connected with a controlled end of the third switching tube. A feedback end of the power management chip is connected with the executing input end of the first optocoupler. An over-current detection end of the power management chip is connected with an input end of the third switching tube. The input end of the third switching tube is connected with the output end of primary winding of the transformer. An output end of the third switching tube is grounded.

The present invention further provides a television, the television includes the aforementioned constant voltage and current synchronic output power supply which includes a transformer for supplying power to LED loads; a conversion circuit for converting an inputted AC power supply to a DC squarewave power supply that is provided to the transformer; and a PWM control circuit for driving the transformer; wherein the constant voltage and current synchronic output power supply further comprises a constant voltage control circuit and a constant current control circuit. The transformer comprises a constant voltage output winding and a constant current output winding. The input end of the constant voltage control circuit is connected with the constant voltage output winding. The output end of the constant current output circuit is connected with a feedback end of the PWM control circuit. The LED loads are connected with the constant current output winding. The power supply end of the constant current control circuit is connected with the constant voltage output winding. A current control end of the constant current control circuit is connected with the LED loads. In which, the constant voltage control circuit is configured for sampling voltages outputted from the constant voltage output winding then the sampled voltages are transferred into corresponding electric signals that are feedbacked to the PWM control circuit later, so as to perform constant voltage control on the output voltage of the transformer. The constant current control circuit is configured for receiving voltages outputted by the constant voltage output winding and opening, to perform constant current control on the current flowing though the LED loads.

Preferably, the constant voltage control circuit includes a sampling circuit and a voltage-stabilizing feedback circuit.

The sampling circuit includes a first resistance and a second resistance. A first end of the first resistance is connected with the output end of the constant voltage output winding. A second end of the first resistance is grounded by passing through the second resistance. The voltage-stabilizing feedback circuit includes a first optocoupler, a first voltage reference chip and a third resistance. The control input end of the first optocoupler is connected with the output end of the constant voltage output winding by passing through the first resistance. The control output end of the first optocouple is connected with a negative end of the first voltage reference chip. An executing input end of the first optocoupler is connected with the feedback end of the PWM control circuit. The executing output end of the first optocoupler is grounded. The positive end of the voltage reference chip is grounded. A voltage reference end of the voltage reference chip is connected with the second end of the first resistance.

Preferably, the constant current control circuit includes a voltage reference circuit and at least a constant current control branch. The input end of the voltage reference circuit is connected with the output end of the constant voltage output winding. The voltage reference circuit is connected with the power supply end of the constant current control branch. An enable end of the voltage reference circuit receives external light signals. The voltage reference circuit is configured for providing a reference voltage to the constant current control branches during receiving the external light signals. The constant current control branch is configured for providing constant current loop to the LED loads.

Preferably, the voltage reference circuit includes a fourth resistance, a fifth resistance, a sixth resistance, a seventh resistance, a first switching tube, a second switching tube and a second voltage reference chip. A first end of the fourth resistance is connected with an output end of the constant voltage output winding. A second end of the fourth resistance is connected with the input end of the first switching tube. An output end of the first switching tube is connected with a negative end of the second voltage reference chip by passing through the fifth resistance. A controlled end of the first switching tube is connected with the input end of the second switching tube by passing though the sixth resistance. The output end of the second switching tube is grounded. The controlled end of the second switching tube is connected with the first end of the seventh resistance. A second end of the seventh resistance is configured for receiving external light signals. A positive end of the second voltage reference chip is grounded. The voltage reference end of the voltage reference chip is connected with the power supply end of the constant current control branch.

Preferably, the constant current control branches are multiple, each constant current control branch is in parallel connection.

Preferably, each constant current control branch includes a switching tube and a current-limiting resistance. The controlled end of the switching tube is connected with the voltage reference end of the voltage reference chip. The input ends of the switching tube are connected with each other, to connect the output end of the LED loads. The output end of the switching tube is grounded by passing though the current-limiting resistance.

Preferably, the constant voltage and current synchronic output power supply further includes a correction circuit. The correction circuit is connected between the LED loads and the constant voltage control circuit, and configured for when voltage deviation of the LED loads is large, the constant voltage control circuit outputs correction signals to the constant voltage control loop, to adjust the output voltage of the constant current output winding.

Preferably, the correction circuit includes a eighth resistance, a ninth resistance, a first diode and a first capacitance. A first end of the eighth resistance is connected with the LED loads. A second end of the eighth resistance is connected with the positive end of the first diode by passing through the ninth resistance. A negative end of the first diode is connected with the second end of the first resistance. A first end of the first capacitance is connected with the second end of the eighth resistance. The second end of the eighth resistance is grounded.

Preferably, the PWM control circuit includes a third switching tube and a power management chip. The driving end of the power management chip is connected with a controlled end of the third switching tube. A feedback end of the power management chip is connected with the executing input end of the first optocoupler. An over-current detection end of the power management chip is connected with an input end of the third switching tube. The input end of the third switching tube is connected with the output end of primary winding of the transformer. An output end of the third switching tube is grounded.

The present invention provides a conversion circuit for converting an inputted AC power supply to a DC square-wave power supply that is provided to the transformer, LED loads, a transformer for supplying power to the LED loads, a PWM control circuit for driving the transformer, a constant voltage control circuit for sampling the voltage outputted by the constant voltage output winding, then the sampled voltages are transferred into the corresponding signals that are feedbacked to the PWM control circuit, to perform constant voltage control of the output voltage of the transformer, and a constant current control circuit for receiving the voltage outputted by the constant voltage output winding then opening, to perform constant current control of the current flowing through LED loads, which may form a constant voltage and current synchronic output power supply. The constant voltage and current synchronic output power supply may perform constant voltage control on the voltage outputted by the constant voltage output winding by the constant voltage control circuit, and perform constant current control on the current outputted by the constant voltage output winding via the constant current control circuit. The constant voltage control circuit and the constant current control circuit may respectively control the output constant voltage and the output constant current of the transformer, no interference each other. Therefore, the television power supply may realize synchronism output of the constant voltage and constant current.

Figure 1:
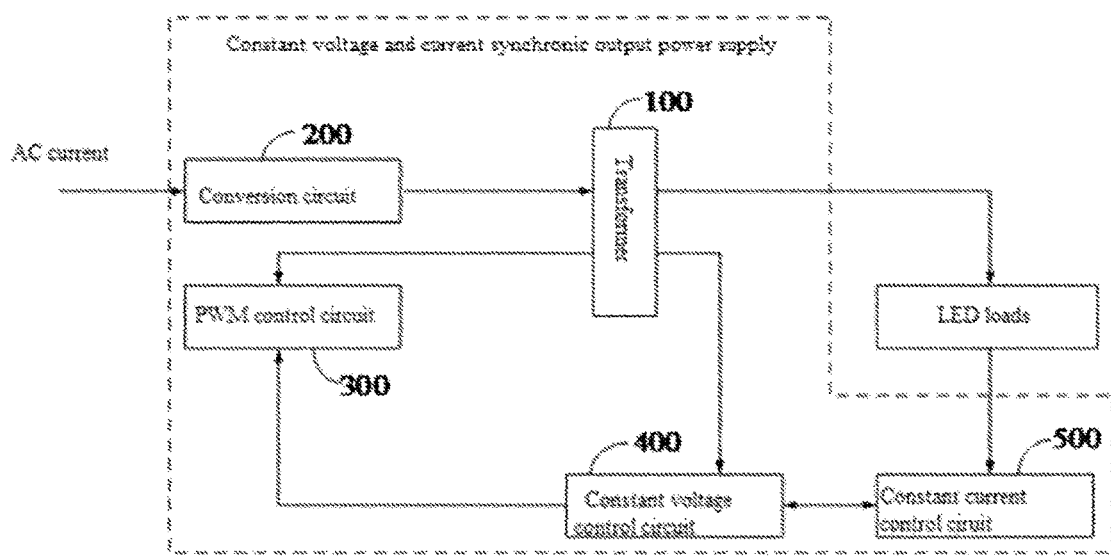
FIG. 1 is a structural diagram of the constant voltage and current synchronic output power supply of a better embodiment of the present invention.

| labeling | name |
| --- | --- |
| 100 | The transformer |
| 200 | The conversion circuit |
| 210 | The AC input end |

-continued

| labeling | name |
| --- | --- |
| 220 | The EMI filter |
| 230 | The rectified filter |
| 300 | The PWM control circuit |
| 400 | The constant voltage control circuit |
| 410 | The sampling circuit |
| 420 | The voltage-stabilizing feedback circuit |
| 500 | The constant current control circuit |
| 510 | The voltage reference circuit |
| 520 | The constant current control branch |
| 600 | The rectified circuit |
| 700 | The first rectified filter circuit |
| 800 | The second rectified filter circuit |
| D1 | The first diode |
| D2 | The second diode |
| D3 | The third diode |
| C1 | The first capacitance |
| C2 | The second capacitance |
| C3 | The third capacitance |
| C4 | The fourth capacitance |
| T | The transformer |
| R1 | The first resistance |
| R2 | The second resistance |
| R3 | The third resistance |
| R4 | The fourth resistance |
| R5 | The fifth resistance |
| R6 | The sixth resistance |
| R7 | The seventh resistance |
| R8 | The eighth resistance |
| R9 | The ninth resistance |
| R10 | The tenth resistance |
| R11 | The eleventh resistance |
| R12 | The twelfth resistance |
| R13 | The thirteenth resistance |
| R14 | The fourteenth resistance |
| R15 | The fifteenth resistance |
| R16 | The sixteenth resistance |
| U1 | The first voltage reference chip |
| U2 | The first optocoupler |
| U3 | The power management chip |
| U4 | The second voltage reference chip |
| S | The current-limiting switching tube |
| Rs | The current-limiting resistance |
| LED | LED lamp |
| Qs | The constant current switching tube |

There and other features, aspects, and advantages of disclosure will be apparent to those skilled in the art from the following detailed description of embodiments, taken together with the drawings and the claims that follow.

DETAILED DESCRIPTION OF PREFERRED EMBODIMENTS

It should be understood that the specific embodiments described herein are merely used for describing the present disclosure, but are not intended to limit the present disclosure.

It should be noted, all the orientation of embodiments, such as top, bottom, left, right, front, rear . . . are only configured for illustrating the relative position of each component in a certain specific position (as shown in Figures) etc. If the specific position has changed, all the orientation would be changed.

In addition, description of the "first" and "second" is only used for description, but cannot be understood indicating or implying the relatively important or implying the number of the subject matters. Thus, the subject matter restricted by the "first" and "second" may indicate or imply including at least one subject matter. In addition, the technical solution in each embodiment may be combined with each other, however, the combination should be realized to those skilled in the art, otherwise the combination cannot be realized or contradict each other, departing from the spirit and scope of the invention.

The present invention discloses a constant voltage and current synchronic output power supply.

Regarding FIG. 11, in the embodiment of the present invention, the constant voltage and current synchronic output power supply includes a transformer 100 for supplying power to LED loads, a conversion circuit 200 for converting an inputted AC power supply to a DC square wave power supply that is provided to the transformer 100, and a PWM control circuit 300 for driving the transformer 100, a constant voltage control circuit 400 and a constant current control circuit 500. The transformer 100 includes a constant voltage output winding and a constant current output winding. The input end of the constant voltage control circuit 400 is connected with the constant voltage output winding. The output end of the constant current output circuit 500 is connected with a feedback end of the PWM control circuit. The LED loads are connected with the constant current output winding. The power supply end of the constant current control circuit 500 is connected with the constant voltage output winding. A current control end of the constant current control circuit 500 is connected with LED loads.

In which, the constant voltage control circuit 400 is configured for sampling the voltage outputted by the constant voltage output winding, then the sampled voltages are transferred into the corresponding signals that are feedbacked to the PWM control circuit 300, to perform constant voltage control on the output voltage of the transformer 100. The constant current control circuit 500 is configured for receiving the voltage outputted by the constant voltage output winding then opening, to perform constant current control on the current flowing through LED loads.

It should be noted, the conversion circuit 200 provides direct current to the transformer 100. The PWM control circuit 300 may convert the direct current provided by the conversion circuit 200 into the pulse voltage, thus the direct current is transferred to the secondary of the transformer 100, voltage is outputted by the constant voltage output winding, and the constant voltage control circuit 400 samples the voltage outputted by the constant voltage output winding and transfers the sampled voltage into corresponding feedback signals. The feedback signals are then outputted to the PWM control circuit 300. The PWM control circuit 300 adjusts the output voltage, enabling the constant voltage output winding to output constant voltage. Moreover, the constant current output winding outputs current and the constant current control circuit 500 controls the outputted current to be constant. The constant voltage control circuit 400 and constant current control circuit 500 respectively control the transformer 100 to output constant voltage and constant current, the controlling processes thereof do not disturb each other.

In the present invention, each LED lamp has one constant current control circuit 500. The number of the constant current control circuit 500 is set in accordance with the number of LED lamps.

In the embodiments of the present invention, by setting the conversion circuit 200, LED loads, the transformer 300 having the constant voltage output winding and the constant current output winding, the PWM control circuit 300 for adjusting the voltage outputted by the transformer 300 based on the feedback signals that are inputted to the PWM control circuit 300, and outputted from the constant voltage control circuit 400, the constant voltage control circuit 400 for sampling the voltage outputted by the constant voltage output winding and transferring the sampled voltage into corresponding feedback signals that are outputted to the PWM control circuit 300 to adjust the output voltage of the transformer 100, the constant current control circuit 500 for performing constant current control on the current outputted by the constant current output winding. The constant voltage control circuit 400 and the constant current control circuit 500 form the constant voltage and current synchronic output power supply where the constant voltage control circuit 400 and the constant current control circuit 500 respectively control the transformer 100 to output the constant voltage and constant current, where the controlling processes do not disturb each other.

Figure 2:
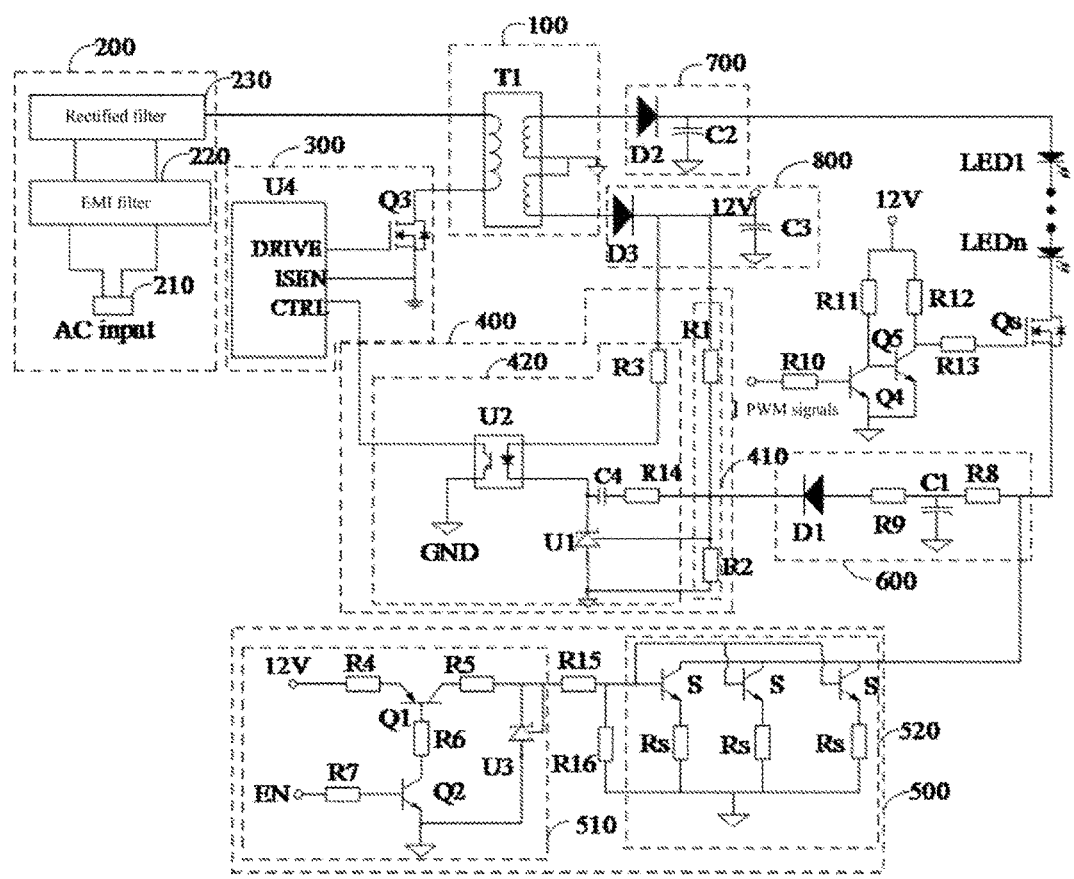
FIG. 2 is a schematic diagram of the constant voltage and current synchronic output power supply of a better embodiment of the present invention.

Regarding FIG. 2, the constant voltage control circuit 400 includes a sampling circuit 410 and a voltage-stabilizing feedback circuit 420. The sampling circuit 410 includes a first resistance R1 and a second resistance R2. A first end of the first resistance R1 is connected with the output end of the constant voltage output winding. A second end of the first resistance R1 is grounded by passing through the second resistance R2. The voltage-stabilizing feedback circuit 420 includes a first optocoupler U1, a first voltage reference chip U2 and a third resistance R3. The control input end of the first optocoupler U1 is connected with the output end of the constant voltage output winding by passing through the first resistance R1. The control output end of the first optocouple U1 is connected with a negative end of the first voltage reference chip U2. An executing input end of the first optocoupler U1 is connected with the feedback end of the PWM control circuit 300. The executing output end of the first optocoupler U1 is grounded. The positive end of the voltage reference chip U2 is grounded. A voltage reference end of the voltage reference chip U2 is connected with the second end of the first resistance R1.

It should be noted, the first resistance and the second resistance R2 are divider resistances for dividing the voltage outputted by the constant voltage output winding, transferring the sampled voltage between two ends of the second resistance R2 to the voltage reference end of the first voltage reference chip U2. When the output voltage of the constant voltage output winding is too high, the sampled voltage between two ends of the second resistance R2 increases, then the voltage at the voltage reference end of the first voltage reference chip U2 increases, thus the current flowing through the first voltage reference chip U2 increases. The current flowing through the executing input end of the first optocoupler U1 increases. The PWM control circuit 300 may adjust the output voltage of the transformer T (the transformer 100 as shown in FIG. 1) to decrease, to ensure the transformer 100 to output constant voltage. Similarity, when the output voltage of the constant voltage output winding is too low, the PWM control circuit 300 may adjust the output voltage of the transformer T to ensure the transformer 100 to output constant voltage.

In which, the constant current control circuit 500 includes a voltage reference circuit 510 and at least one constant current control branch 520. The input end of the voltage reference circuit 510 is connected with the output end of the constant voltage output winding. The voltage reference circuit 510 is connected with the power supply end of the constant current control branch 520. The enable end of the voltage reference circuit 510 receives the external light signals then provides reference voltage to the constant current control branches 520. The constant current control branch 520 is configured for controlling the current flowing through the LED loads.

The constant current control branches are multiple, each constant current control branch 520 is in parallel connection. In the embodiment, the first switching tube Q1 and the second switching tube Q2 are triodes.

In which, the voltage reference circuit 510 includes a fourth resistance, a fifth resistance, a sixth resistance, a seventh resistance, a first switching tube Q1, a second switching tube Q2 and a second voltage reference circuit chip U3. A first end of the fourth resistance is connected with an output end of the constant voltage output winding. A second end of the fourth resistance is connected with the input end of the first switching tube Q1. An output end of the first switching tube Q1 is connected with a negative end of the second voltage reference chip U3. A controlled end of the first switching tube Q1 is connected with the input end of the second switching tube Q2 by passing though the sixth resistance. The output end of the second switching tube Q2 is grounded. The controlled end of the second switching tube Q2 is connected with the first end of the seventh resistance. A second end of the seventh resistance is configured for receiving external light signals. A positive end of the second voltage reference chip is grounded. The voltage reference end of the voltage reference chip U3 is connected with the power supply end of the constant current control branch 520.

It should be noted, the enable end of the voltage reference circuit 510 receives lamp signals of the high electric level to control the first switching tube Q1 turning on and the enable end of the second switching tube Q2 is grounded. When the bias voltage of the second switching tube Q2 satisfies conditions of turning on, the second switching tube Q2 is turning on too. The voltage outputted by the constant voltage output winding will be accurately transferred to the switching tubes in the constant current control branch 520 via the second voltage reference chip U3, to conduct the constant current control branch 520, to make the current constant in the LED loads.

In which, each constant current control branch 520 includes a current-limiting switching tube S and a current-limiting resistance Rs. An enable end of the current-limiting switching tube S is connected with the voltage reference end of the second voltage reference chip U3. Input ends of the current-limiting switching tube S are connected with each other, then connected to the output ends of LED loads. The output end of the current-limiting switching tube S is grounded via the current-limiting resistance Rs. The number of the constant current control branches 520 is determined according to the current of LED loads. In the embodiment, the constant current control circuit 500 includes three constant current control branches 520 where the current-limiting resistances Rs therein are the same.

It should be noted, when conducting the constant current control branches 520, the current flowing through LED loads is divided into three constant current control branches 520, by using the current-limiting resistance Rs, the input current may be limited, to satisfy the purpose of controlling the current to be constant.

Furthermore, the constant voltage and current synchronic output power supply includes a rectified circuit 600, the input end of the rectified circuit 600 is connected with the feedback end of the constant voltage control circuit 400.

In which, the rectified circuit 600 includes an eighth resistance R8, a ninth resistance R9, a first diode D1 and a first capacitance C1. A first end of the eighth resistance R8 is connected with the LED loads. A second end of the eighth resistance R8 is connected with the positive end of the first diode D1 by passing through the ninth resistance R9. A negative end of the first diode D1 is connected with the second end of the first resistance R1. A first end of the first capacitance C1 is connected with the second end of the eighth resistance R8. The second end of the eighth resistance R8 is grounded.

It should be noted, when the voltage deviation between two ends of LED loads is large, the current flowing through LED loads increases too, the heat of the LED lamp and the current-limiting resistance Rs is enlarged, the rectified circuit 600 may sample the output voltage of LED loads via the rectified circuit 600 and output the sampled voltage signals to the feedback end of the constant voltage control circuit 400, that is the voltage reference end of the first voltage reference chip U2. The constant voltage control circuit 400 may adjust the output voltage of the transformer based on the voltage signals inputted by the rectified circuit 600, then being transferred into corresponding feedback signals that are outputted to the PWM control circuit 300, therefore realizing the constant current control on LED loads.

In which, the PEM control circuit 300 includes a third switching tube Q3 and a power management chip U4. The driving end of the power management chip U4 (as referred to DRIVEN in FIG. 2) is connected with the controlled end of the third switching tube Q3. The feedback end of the power management chip U4 (as referred to CTRL in FIG. 2) is connected with the executing input end of the first optocoupler U1. The over-current detection end of the power management chip U4 (as referred to ISEN in FIG. 2) is connected with the input end of the third switching tube Q3. The input end of the third switching tube Q3 is connected with the output end of primary winding of the transformer 100. The output end of the third switching tube Q3 is grounded.

It should be noted, when the over-current detection end of the power management chip U4 detects the input voltage of the third switching tube Q3 exceeds a preset value, the power management chip U4 stops outputting control signals, and makes the third switching tube Q3 turn off, which may protect constant voltage and current synchronic output power supply. In the embodiment, the power management chip U4 uses the TEA1832 chip to realize the above purpose, by the TEA1832 chip, when power supply loads less.

In which, the conversion circuit 200 includes an input port 210, an EMI filter 220 and a rectified filter 230. The input end of the input port 210 is connected with external current. The output end of the input port 210 is connected with the input end of the EMI filter 220. The output end of the EMI filter 220 is connected with the input end of the rectified filter 230. The output end of the rectified filter 230 is connected with the input end of the primary winding of the transformer T.

The LED loads includes a LED lamp and a LED driving circuit. The LED driving circuit includes a tenth resistance R10, a eleventh resistance R11, a twelfth resistance R12, a thirteenth resistance R13, a fourth switching tube Q4, a fifth switching tube Q5 and the constant current switching tube Qs in accordance with the number of LED lamps. The first end of the tenth resistance R10 is connected with external PWM signals. The second end of the tenth resistance R10 is connected with the controlling end of the fourth switching tube Q4. The input end of the fourth switching tube Q4 is connected with the output end of the constant voltage output winding by passing though the eleventh resistance R11. The controlled end of the fifth switching tube Q5 is connected with the input end of the fourth switching tube Q4. The input end of the fifth switching tube Q5 is connected with the output end of the constant voltage output winding by passing though the twelfth resistance R12. The output end of the fifth switching tube Q5 is grounded. The controlled end of the constant current switching tube Qs is connected with the input end of the switching tube Q5 by passing though the thirteenth resistance R13. The input end of the constant current switching tube Qs and the output end thereof are respectively set between the output end of the LED lamp and the input end of the constant current control circuit 500.

When the external PWM signals are high electric level, conducting the fourth switching tube Q4 and fifth switching tube Q5, the constant voltage output winding outputs voltage to the controlled end of the constant current switching tube Qs, conducting the constant current switching tube Qs. When the external PWM signals are low electric level, the constant current switching tube Qs turns off, by controlling the duty ratio of the PWM signals, the brightness of LED lamps may be adjusted.

Furthermore, the constant voltage and current synchronic output power supply further includes a first rectified filter circuit 700 and a second rectified filter circuit 800. The first rectified filter circuit 700 includes a second diode D2 and a second capacitance C2. The positive end of the second diode D2 is connected with the output end of the constant current output winding. The negative end of the second diode D2 is connected with the input end of the LED load. The first end of the second capacitance C2 is connected with the negative end of the second diode D2, the second end of the second capacitance is grounded. The second rectified filter circuit 800 includes a third diode D3 and a third capacitance C3. The positive end of third diode D3 is connected with the output end of the constant voltage output winding. The negative end of the third diode D3 is grounded by passing though the third capacitance C3. It is easy to understand, the first rectified filter circuit 700 is configured for rectifying and filtering the output voltage of the constant current output winding, to make the output voltage more stable. The second rectified filter circuit 800 is configured for rectifying and filtering the output voltage of the constant voltage output winding, to make the output voltage more stable.

The voltage-stabilizing feedback circuit 420 further includes a fourth capacitance C4 and a fourteenth resistance R14. The first end of the fourth capacitance C4 is connected with the negative end of the first voltage reference chip U2. The second end of the fourth capacitance C4 is connected with the second end of the first resistance R1 by passing though the fourteenth resistance R14. The fourth resistance C4 and the fourteenth resistance R14 may form a RC snubber circuit, which may absorb the AC interference signals in the constant voltage control circuit 400.

The constant current control circuit 500 further includes a fifteenth resistance R15 and a sixteenth resistance R16. A first end of the fifteenth resistance R15 is connected with the negative end of the second voltage reference chip U3. A second end of the fifteenth resistance R15 is connected with a controlled end of the constant current control branch 520. A first end of the sixteenth resistance R16 is connected with a second end of the fifteenth resistance R15. The second end of the sixteenth resistance R16 is grounded. The fifteenth resistance R15 may restrict the output current of the constant voltage output winding in a safe range. The sixteenth resistance R16 may expedite the turn off of the switching tube S in the constant current control branch 520.

Overall, the work principle of the constant voltage and current synchronic output power supply is interpreted with the specific drawings.

When it is in standby mode, the lamp signals are low electric level, the first switch tube Q1 and second switch tube Q2 cut off. The second voltage reference chip U3 in the constant current control circuit 500 stops working since without providing the reference voltage. LED lamps are in off state without current flowing through. The constant voltage control circuit 400 uses the sample circuit 410 to sample the output voltage of the constant voltage output winding then the sampled voltage is feedbacked to the power management chip U4, so as to control the turn on/off status of the third switching tube Q3, making the rectified output voltage of the transformer T constant.

When it starts up, the voltage reference circuit 510 is the high electric level, conducting the first switching tube Q1 and the second switching tube Q2. 12V voltage may provide reference voltage to the second voltage reference chip U3 by passing though the first switching tube Q1. The constant current control circuit 500 starts to work. LED drive circuit drives the constant current switching tube Qs based on the external input PWM signals. The LED lamps may turn on/off in accordance with the PWM control signals. When the PWM is the high electric level, the fourth switching tube Q4 and the fifth switching tube Q5 are conducted, then conducting the constant current switching tubes. The current in the LED lamps flowing through the constant current switching to a collector of the third diode of the constant current control circuit 500. The reference voltage provided by the second voltage reference chip U3 after being limited may control the base of each triode, therefore making the current flowing through LED lamps constant.

Meanwhile, the constant voltage output winding outputs the voltage that is sampled by the sampling circuit 410 then the sampled voltage is outputted to the voltage reference end of the first voltage reference chip U2, so that the transformer T may output constant voltage of 12V, enabling the transformer T to output constant voltage and constant current simultaneously.

When the voltage deviation between two ends of the LED loads is large, the heat of the current-limiting resistance Rs in the constant current control circuit 500 is enlarged, the rectified circuit 600 samples the output voltage of LED loads and transferring the sampled voltage to the feedback end of the constant voltage control circuit 400. The constant voltage control circuit 400 controls the output voltage of the transformer T to decrease, so as to decrease the temperature rise of the constant current control circuit 500, optimizing the power supply system.

The present invention discloses a power supply for simultaneously supplying constant voltage and constant current, solving the problem of LED backlight scintillation in the television caused by traditional power supply, improving the stability of the LED lamps.

The present invention further discloses a television. The television includes the aforementioned constant voltage and current synchronic output power supply. The specific structure thereof is referred to the above embodiments. Due to the television adopting the aforementioned technical solutions, at least the television owns the beneficial functions, and without further description herewith.

The foregoing descriptions are merely embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

We claim:

1. A constant voltage and current synchronic output power supply, comprising:

a transformer for supplying power to LED loads;
a conversion circuit for converting an inputted AC power supply to a DC square wave power supply that is provided to the transformer; and
a PWM control circuit for driving the transformer;
wherein the constant voltage and current synchronic output power supply further comprises a constant voltage control circuit and a constant current control circuit; the transformer comprises a constant voltage output winding and a constant current output winding; the input end of the constant voltage control circuit is connected with the constant voltage output winding; the output end of the constant current output circuit is connected with a feedback end of the PWM control circuit; the LED loads are connected with the constant current output winding; the power supply end of the constant current control circuit is connected with the constant voltage output winding; a current control end of the constant current control circuit is connected with the LED loads;
the constant voltage control circuit, is configured for sampling the voltage outputted by the constant voltage output winding, then the sampled voltages are transferred into corresponding signals to be feedbacked to the PWM control circuit, to perform constant voltage control to the output voltage of the transformer;
the constant current control circuit, is configured for receiving the voltage outputted by the constant voltage output winding and then opening, to perform constant current control to the current flowing through the LED loads.

2. The constant voltage and current synchronic output power supply of claim 1, wherein the constant voltage control circuit comprising a sampling circuit and a voltage-stabilizing feedback circuit;
the sampling circuit comprises a first resistance and a second resistance; a first end of the first resistance is connected with the output end of the constant voltage output winding; a second end of the first resistance is grounded by passing through the second resistance;
the voltage-stabilizing feedback circuit comprising a first optocoupler, a first voltage reference chip and a third resistance; a control input end of the first optocoupler is connected with the output end of the constant voltage output winding by passing through the first resistance; a control output end of the first optocoupler is connected with the negative end of the first voltage reference chip;
an executing input end of the first optocoupler is connected with the feedback end of the PWM control circuit; the executing output end of the first optocoupler is grounded; the positive end of the voltage reference chip is grounded; a voltage reference end of the voltage reference chip is connected with the second end of the first resistance.

3. The constant voltage and current synchronic output power supply of claim 1, wherein, the constant current control circuit comprises a voltage reference circuit and at least one constant current control branch; an input end of the voltage reference circuit is connected with an output end of the constant voltage output winding;
the voltage reference circuit is connected with a power supply end of the constant current control branch; an enable end of the voltage reference circuit receives external light signals; the voltage reference circuit is configured for providing reference voltage to the constant current control branches during receiving the external light signals; the constant current control branch is configured for providing constant current loop to the LED loads.

4. The constant voltage and current synchronic output power supply of claim 3, wherein, the voltage reference circuit comprises a fourth resistance, a fifth resistance, a sixth resistance, a seventh resistance, a first switching tube, a second switching tube and a second voltage reference chip;
a first end of the fourth resistance is connected with a output end of the constant voltage output winding; a second end of the fourth resistance is connected with the input end of the first switching tube; a output end of the first switching tube is connected with a negative end of the second voltage reference chip; a controlled end of the first switching tube is connected with the input end of the second switching tube; the output end of the second switching tube is grounded; the controlling end of the second switching tube is connected with the first end of the seventh resistance; a second end of the seventh resistance is configured for receiving external light signals; a positive end of the second voltage reference chip is grounded; the voltage reference end of the voltage reference chip is grounded, and the power supply end of the constant current control branch is grounded.

5. The constant voltage and current synchronic output power supply of claim 4, wherein, the constant current control branches are multiple, each constant current control branch is in parallel connection.

6. The constant voltage and current synchronic output power supply of claim 5, wherein each constant current control branch comprises a switching tube and a current-limiting resistance;
a controlled end of the switching tube is connected with the voltage reference end of the voltage reference chip; the input ends of the switching tube are connected with each other, to connect the output end of the LED loads; the output end of the switching tube is grounded by passing through the current-limiting resistance.

7. The constant voltage and current synchronic output power supply of claim 1, wherein further comprises a correction circuit; the correction circuit is connected between the LED loads and the constant voltage control circuit, and configured for when voltage deviation of the LED loads is large, the constant voltage control circuit outputs correction signals to the constant voltage control loop, to adjust the voltage outputted by the constant current output winding.

8. The constant voltage and current synchronic output power supply of claim 7, wherein, the correction circuit comprises a eighth resistance, a ninth resistance, a first diode and a first capacitance;
a first end of the eighth resistance is connected with the LED loads, a second end of the eighth resistance is connected with the positive end of the first diode by passing through the night resistance; a first end of the first capacitance is connected with the second end of the eighth resistance; the second end of the eighth resistance is grounded.

9. The constant voltage and current synchronic output power supply of claim 1, wherein the PWM control circuit comprises a third switching tube and a power management IC;
a driving end of the power management IC is connected with a controlled end of the third switching tube; a feedback end of the power management IC is connected with the executing input end of the first optocoupler; an over-current detection end of the power management IC is connected with an input end of the third switching tube; the input end of the third switching tube is connected with the output end of primary winding of the transformer; an output end of the third switching tube is grounded.

10. A television, comprising: a constant voltage and current synchronic output power supply of claim 1; wherein the constant voltage and current synchronic output power supply comprises:
 a transformer for supplying power to LED loads;
 a conversion circuit for converting an inputted AC power supply to a DC square wave power supply that is provided to the transformer; and
 a PWM control circuit for driving the transformer;
 wherein the constant voltage and current synchronic output power supply further comprises a constant voltage control circuit and a constant current control circuit; the transformer comprises a constant voltage output winding and a constant current output winding; the input end of the constant voltage control circuit is connected with the constant voltage output winding; the output end of the constant voltage output circuit is connected with a feedback end of the PWM control circuit; the LED loads are connected with the constant current output winding; the power supply end of the constant current control circuit Is connected with the constant voltage output winding; the current control end of the constant current control circuit is connected with the LED loads;
 the constant voltage control circuit is configured for sampling the voltage outputted by the constant voltage output winding, then the sampled voltages are transferred into the corresponding signals that are feedbacked to the PWM control circuit, to perform constant voltage control of the output voltage of the transformer;
 the constant current control circuit is configured for receiving the voltage outputted by the constant voltage output winding then opening, to perform constant current control of the current flowing through LED loads.

11. The television of claim 10, wherein, the constant voltage control circuit comprises a sampling circuit and a voltage-stabilizing feedback circuit;
 the sampling circuit comprises a first resistance and a second resistance; a first end of the first resistance is connected with the output end of the constant voltage output winding; a second end of the first resistance is grounded by passing through the second resistance;
 the voltage-stabilizing feedback circuit comprises a first optocoupler, a first voltage reference chip and a third resistance; a control input end of the first optocoupler is connected with the output end of the constant voltage output winding by passing through the first resistance; a control output end of the first optocoupler is connected with the negative end of the first voltage reference chip;
 an executing input end of the first optocoupler is connected with the feedback end of the PWM control circuit; the executing output end of the first optocoupler is grounded; the positive end of the voltage reference chip is grounded; a voltage reference end of the voltage reference chip is connected with the second end of the first resistance.

12. The television of claim 10, wherein the constant current control circuit comprises a voltage reference circuit and at least one constant current control branch; an input end of the voltage reference circuit is connected with an output end of the constant voltage output winding; the voltage reference circuit is connected with a power supply end of the constant current control branch; an enable end of the voltage reference circuit receives external light signals;
 the voltage reference circuit is configured for providing reference voltage to the constant current control branches during receiving the external light signals; the constant current control branch is configured for providing constant current loop to the LED loads.

13. The television of claim 12, wherein the voltage reference circuit comprises a fourth resistance, a fifth resistance, a sixth resistance, a seventh resistance, a first switching tube, a second switching tube and a second voltage reference chip;
 a first end of the fourth resistance is connected with a output end of the constant voltage output winding; a second end of the fourth resistance is connected with the input end of the first switching tube; a output end of the first switching tube is connected with a negative end of the second voltage reference chip; a controlled end of the first switching tube is connected with the input end of the second switching tube; the output end of the second switching tube is grounded; the controlling end of the second switching tube is connected with the first end of the seventh resistance; a second end of the seventh resistance is configured for receiving external light signals; a positive end of the second voltage reference chip is grounded; the voltage reference end of the voltage reference chip is grounded, and the power supply end of the constant current control branch is grounded.

14. The television of claim 13, wherein the constant current control branches are multiple, each constant current control branch is in parallel connection.

15. The television of claim 14, wherein, each constant current branch comprises a switching tube and a current-limiting resistance; a controlled end of the switching tube is connected with the voltage reference end of the voltage reference chip; the input ends of the switching tube are connected with each other, to connect the output end of the LED loads; the output end of the switching tube is grounded by passing through the current-limiting resistance.

16. The television of claim 10, wherein, the constant voltage and current synchronic output power supply further comprises a correction circuit; the correction circuit is connected between the LED loads and the constant voltage control circuit, and configured for when voltage deviation of the LED loads is large, the constant voltage control circuit outputs correction signals to the constant voltage control loop, to adjust the voltage outputted by the constant current output winding.

17. The television of claim 16, wherein the correction circuit comprises a eighth resistance, a ninth resistance, a first diode and a first capacitance; a first end of the eighth resistance is connected with the LED loads, a second end of the eighth resistance is connected with the positive end of the first diode by passing through the ninth resistance; a first end of the first capacitance is connected with the second end of the eighth resistance; the second end of the eighth resistance is grounded.

18. The television of claim 10, wherein the PWM control circuit comprises a third switching tube and a power management chip; a driving end of the power management chip is connected with a controlled end of the third switching tube; a feedback end of the power management chip is connected with the executing input end of the first optocoupler; an over-current detection end of the power management chip is connected with an input end of the third switching tube; the input end of the third switching tube is connected with the output end of primary winding of the transformer; an output end of the third switching tube is grounded.

* * * * *